United States Patent
Duan et al.

(10) Patent No.: US 8,621,714 B2
(45) Date of Patent: Jan. 7, 2014

(54) HINGE ASSEMBLY FOR FOLDABLE ELECTRONIC DEVICE

(75) Inventors: Chao Duan, Shenzhen (CN); Chia-Hua Chen, Shindian (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 76 days.

(21) Appl. No.: 13/454,640

(22) Filed: Apr. 24, 2012

(65) Prior Publication Data
US 2012/0206872 A1     Aug. 16, 2012

Related U.S. Application Data

(63) Continuation-in-part of application No. 12/493,348, filed on Jun. 29, 2009, now abandoned.

(30) Foreign Application Priority Data

Dec. 31, 2008     (CN) .......................... 2008 1 0306731

(51) Int. Cl.
*E05D 11/10*     (2006.01)
(52) U.S. Cl.
USPC ........................................ 16/303
(58) Field of Classification Search
USPC ........... 16/303, 307, 344, 341, 342, 327, 328, 16/329, 330, 331, 332, 333, 334
See application file for complete search history.

(56) References Cited

U.S. PATENT DOCUMENTS

| | | | |
|---|---|---|---|
| 6,175,990 B1 * | 1/2001 | Kato et al. ....................... | 16/334 |
| 6,950,686 B2 * | 9/2005 | Won ............................ | 455/575.3 |
| 7,085,375 B2 * | 8/2006 | Katoh ....................... | 379/433.13 |
| 7,100,244 B2 * | 9/2006 | Qin et al. .......................... | 16/330 |
| 7,111,361 B2 * | 9/2006 | Li et al. ........................... | 16/284 |
| 7,168,134 B2 * | 1/2007 | Minami et al. ................... | 16/303 |
| 7,346,377 B2 * | 3/2008 | Sakai et al. ................. | 455/575.3 |
| 7,383,618 B2 * | 6/2008 | Lu et al. .......................... | 16/330 |
| 7,522,946 B2 * | 4/2009 | Im ............................... | 455/575.3 |
| 7,543,357 B2 * | 6/2009 | Ishikawa et al. ................ | 16/303 |
| 7,707,688 B2 * | 5/2010 | Ishikawa et al. ................ | 16/303 |
| 2004/0216275 A1 * | 11/2004 | Hayashi .......................... | 16/303 |
| 2004/0237259 A1 * | 12/2004 | Huang et al. .................... | 16/330 |
| 2005/0115813 A1 * | 6/2005 | Sakai et al. .................... | 200/293 |

(Continued)

FOREIGN PATENT DOCUMENTS

CN     201016361 Y     2/2008
TW     M 260946        4/2005

(Continued)

*Primary Examiner* — Jeffrey O Brien
(74) *Attorney, Agent, or Firm* — Altis Law Group, Inc.

(57) ABSTRACT

A hinge assembly includes a shaft, a main body drive member, a follower, and a resilient member. The main body drive member, the follower, and the resilient member are mounted with the shaft in turn. One end of the main body drive member has a cam. One end of the follower has a cam engaging with the cam of the main body drive member. The resilient member causes the cam of the follower to resist the cam of the main body drive member due to the decompression of the resilient member, and when the follower is manually rotated relative to the main body drive member about an angle, the follower automatically rotates relative to the main body drive member due to the decompression of the resilient member.

5 Claims, 9 Drawing Sheets

(56) References Cited

U.S. PATENT DOCUMENTS

| | | | |
|---|---|---|---|
| 2006/0101618 A1* | 5/2006 | Minami et al. | 16/303 |
| 2006/0112517 A1* | 6/2006 | Luo et al. | 16/330 |
| 2006/0117529 A1* | 6/2006 | Duan et al. | 16/303 |
| 2007/0094842 A1* | 5/2007 | Chang | 16/330 |
| 2008/0118057 A1* | 5/2008 | Son et al. | 379/433.01 |
| 2009/0300882 A1* | 12/2009 | Hayashi | 16/303 |

FOREIGN PATENT DOCUMENTS

| | | |
|---|---|---|
| TW | 200735750 | 9/2007 |
| TW | M339891 | 9/2008 |
| TW | M347801 | 12/2008 |

* cited by examiner

HINGE ASSEMBLY FOR FOLDABLE ELECTRONIC DEVICE

CROSS-REFERENCE TO RELATED APPLICATION

This application is a continuation in part application of U.S. Ser. No. 12/493,348 filed Jun. 29, 2009.

BACKGROUND

1. Technical Field

The present invention generally relates to hinge assemblies and, more particularly, to a hinge assembly for hinging together housings of foldable electronic devices.

2. Description of Related Art

With the development of the technologies of wireless communication and information processing, portable electronic devices such as mobile phones and notebooks are now in widespread use. Foldable electronic devices are particularly favored by consumers for their convenience. Generally, foldable electronic devices have a main body and a cover. Various types of hinge assemblies are used to join the main body and the cover of the foldable electronic device, so that the cover can unfold from and fold on the main body.

A conventional hinge assembly includes a shaft, a cam, a follower engaging with the cam, and a spring. The cam, the follower, and the spring are mounted on the shaft. However, when using such a hinge assembly, a cover generally is manually rotated to a relative large angle, for example, 70-80 degrees, relative to the main body, before the cover can automatically open.

Therefore, there is room for improvement within the art.

BRIEF DESCRIPTION OF THE DRAWINGS

Many aspects of the present hinge assembly for foldable electronic device can be better understood with reference to the following drawings. The components in the drawings are not necessarily drawn to scale, the emphasis instead being placed upon clearly illustrating the principles of the present hinge assembly for foldable electronic device. Moreover, in the drawings, like reference numerals designate corresponding parts throughout the several views.

DETAILED DESCRIPTION

Figure 1:
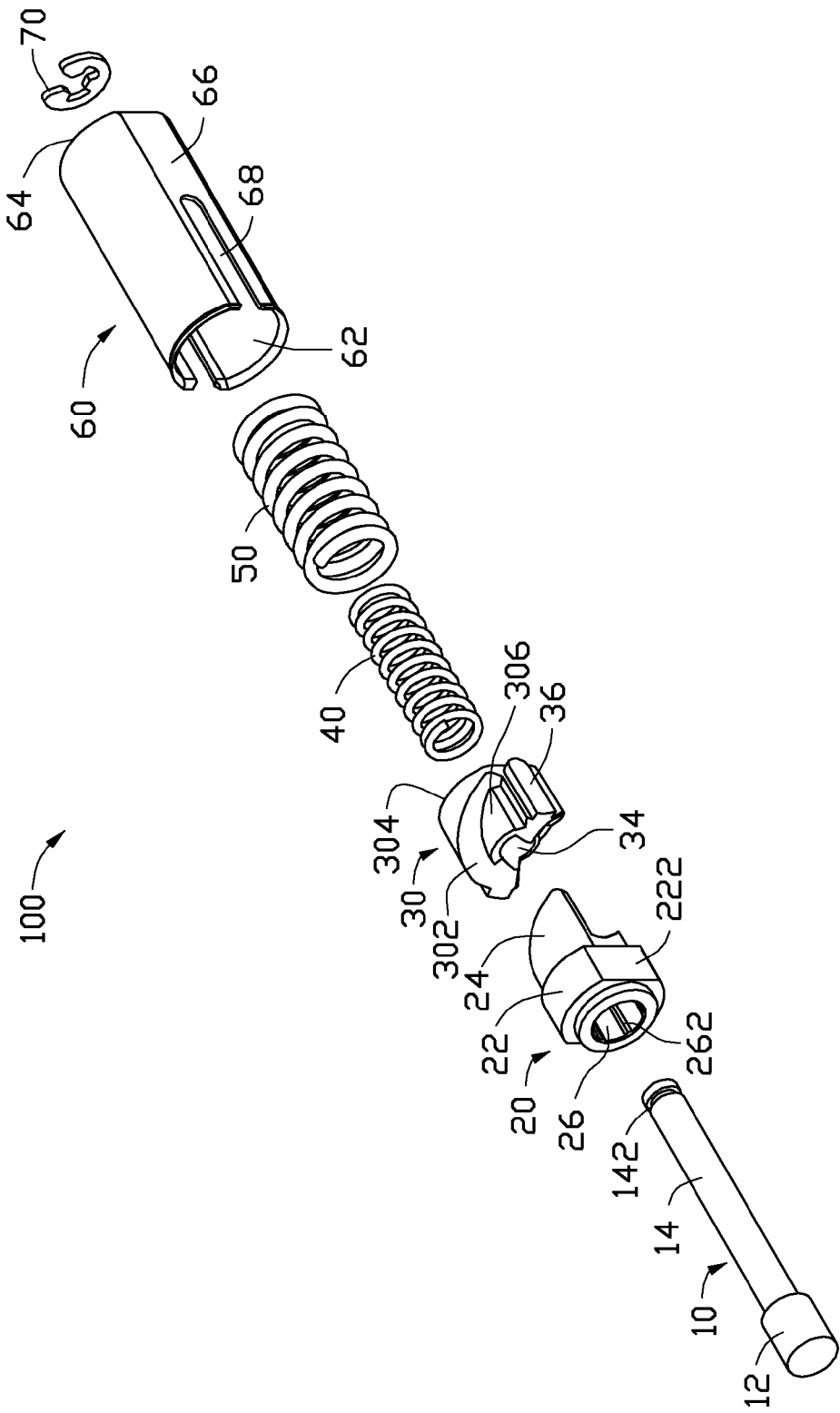
FIG. 1 is an explored, isometric view of a hinge assembly, according to an exemplary embodiment.
Figure 2:
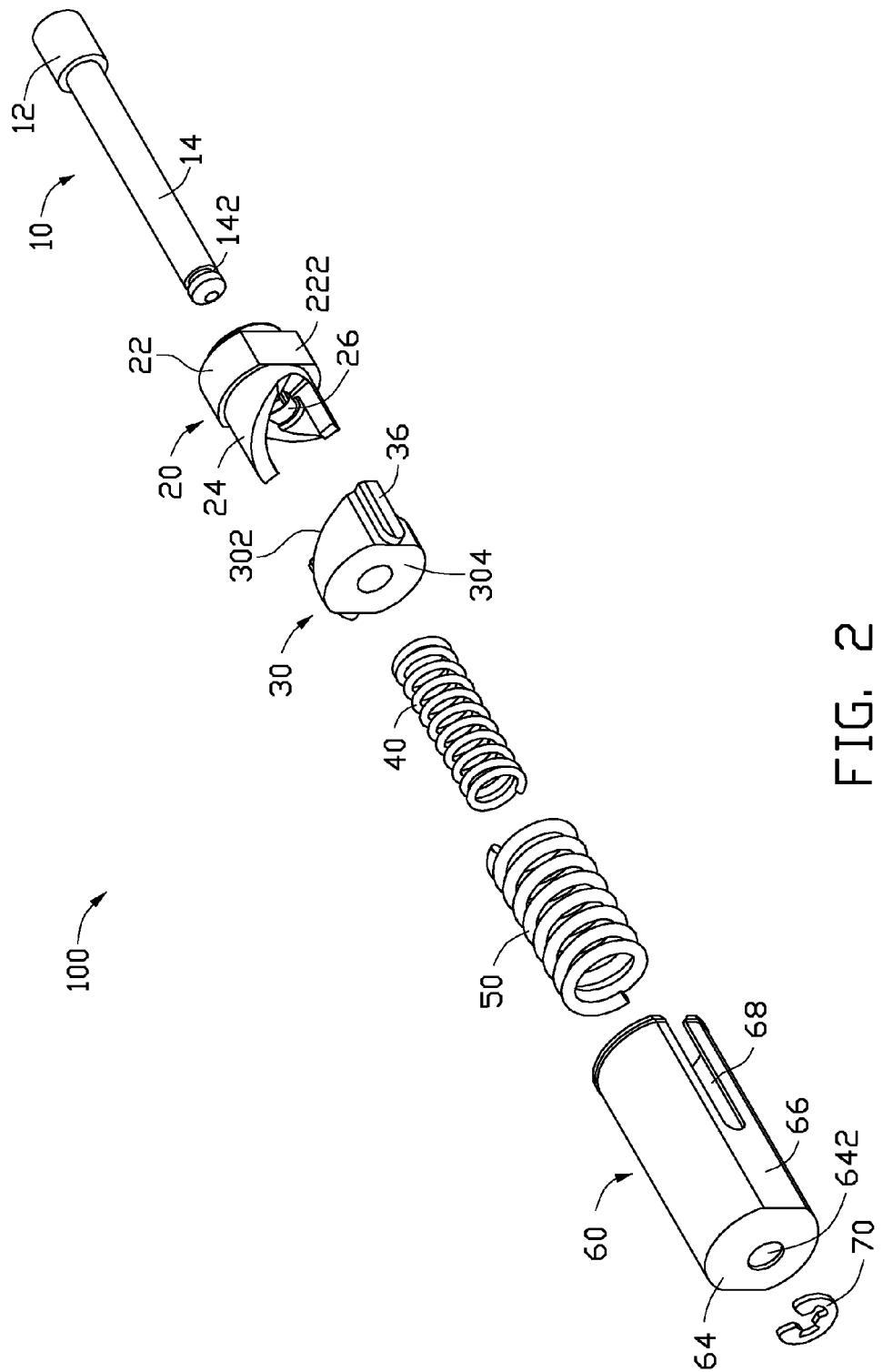
FIG. 2 is similar to FIG. 1, but viewed from another angle.
Figure 7:
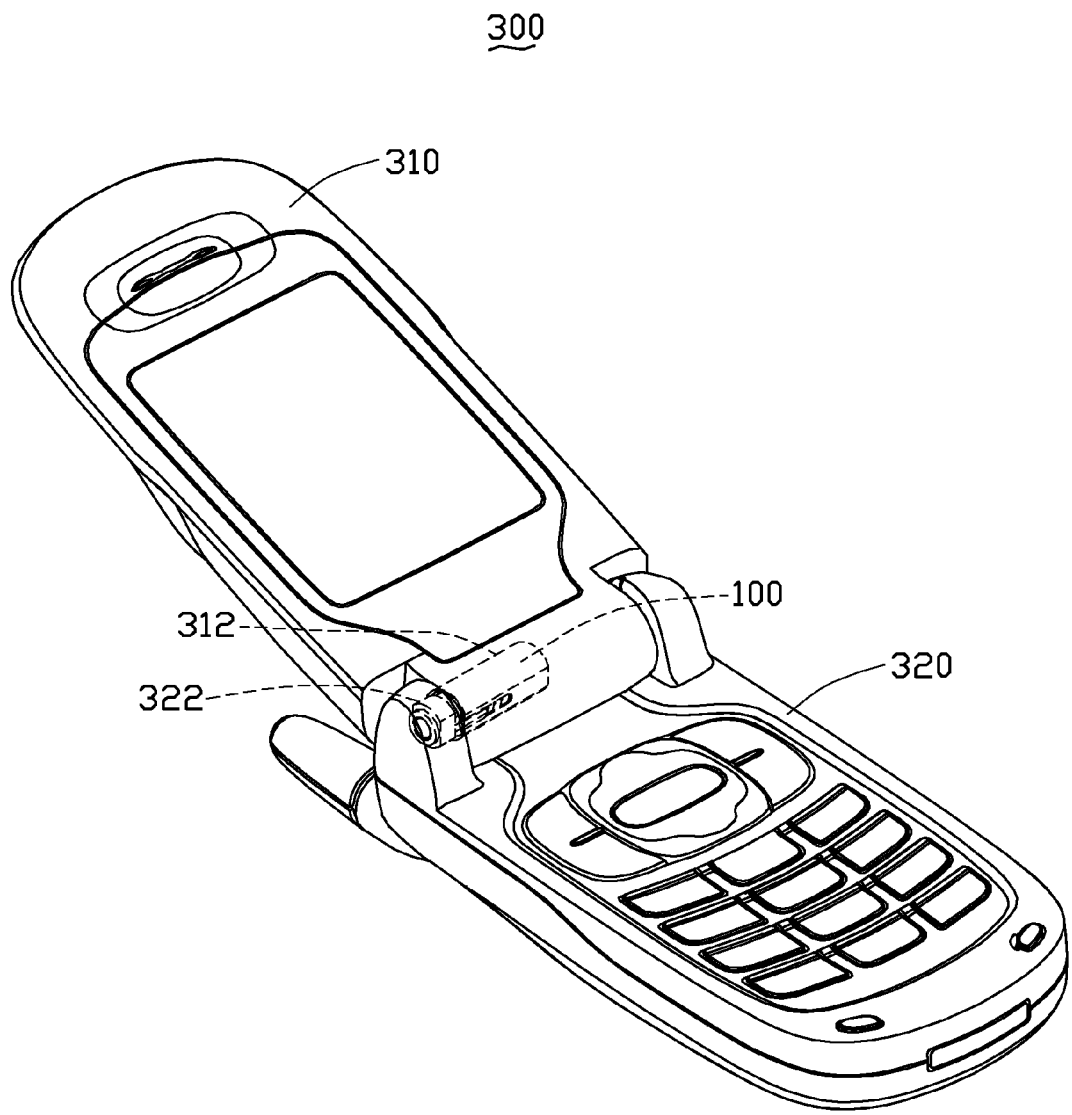
FIG. 7 is an isometric view of a foldable electronic device with the hinge assembly shown in FIG. 1.

FIGS. 1-2 show a hinge assembly 100 according to an exemplary embodiment of the present hinge system. Referring to FIG. 7, the hinge assembly 100, in the embodiment illustrated, is used to interconnect a main body 320 and a cover 310 of a foldable electronic device 300. The cover 310 has a hinge cavity 312 formed at one end. The main body 320 defines a mounting hole 322 in one end. The hinge assembly 100 includes a shaft 10, a main body drive member 20, a follower 30, a first resilient member 40, a second resilient member 50, a cover drive member 60, and a disk 70. The shaft 10 extends through the main body drive member 20, the follower 30, the first resilient member 40, the second resilient member 50, the cover drive member 60, and the disk 70, thereby integrating the hinge assembly 100 into a complete unit. While the hinge assembly 100 is shown incorporated into the foldable electronic device 300, it is to be understood that the hinge assembly 100 or obvious variations thereof may prove useful in other work environments (e.g., cabinet doors) as well.

The shaft 10 has a cylindrical head 12 having a larger diameter and a cylindrical rod 14 having a smaller diameter. The head 12 is formed at one end of the rod 14. The other end of the rod 14 opposing to the head 12 defines an annular groove 142.

The main body drive member 20 includes a fixing portion 22 and a cam 24. The fixing portion 22 is substantially cylindrical and has two symmetrical flat surfaces 222 on the outer peripheral wall. The fixing portion 22 engages with the main body 320 of the foldable electronic device 300 so that the main body drive member 20 rotates with the main body 320. The fixing portion 22 defines a central hole 26 and has a plurality of positioning protrusions 262 on the inner wall. The head 12 is fixed in the central hole 26 due to the positioning protrusions 262 and moves with the main body drive member 20.

Figure 3:
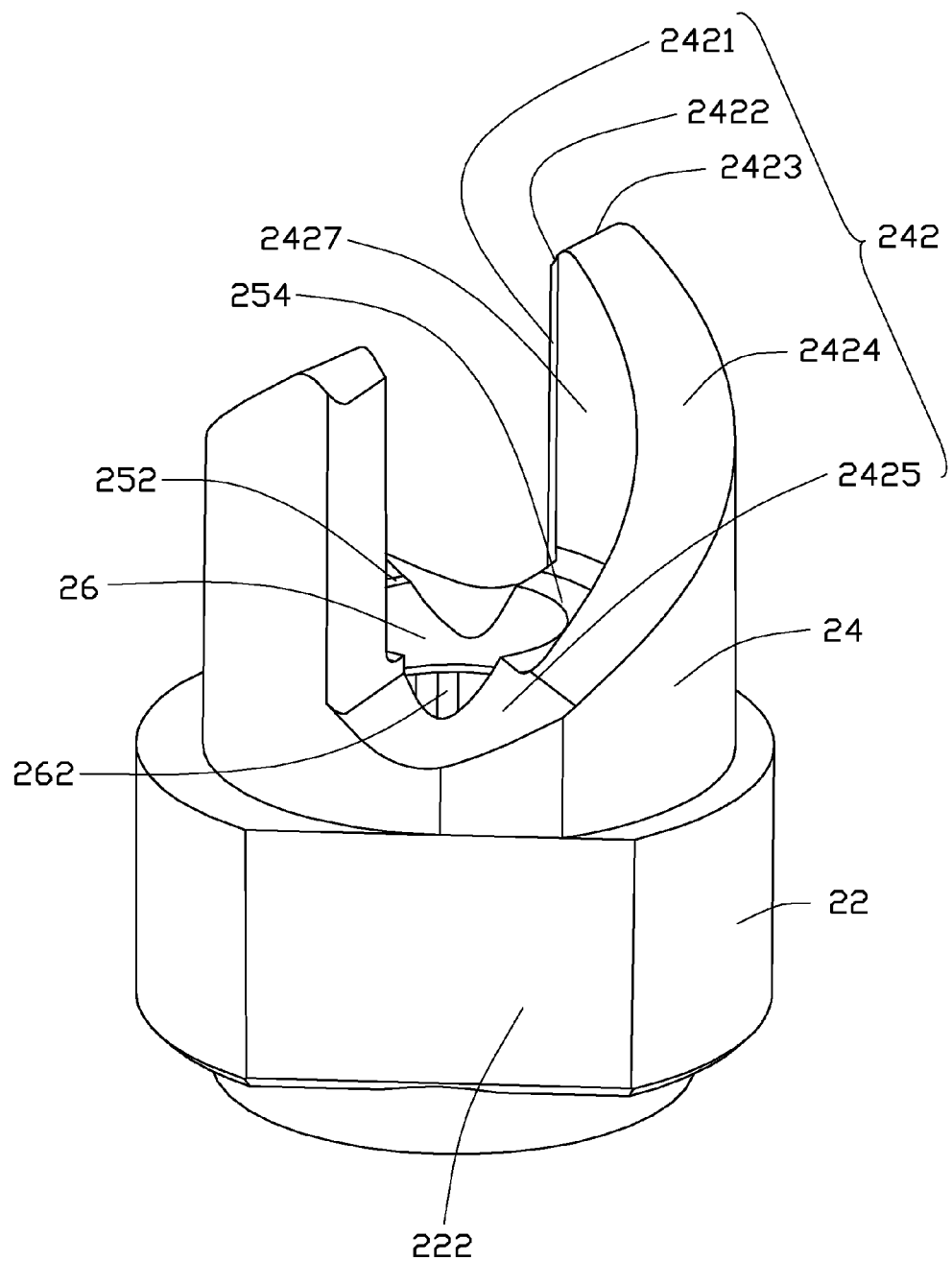
FIG. 3 is an enlarged, isometric view of the main body drive member of the hinge assembly shown in FIG. 1.

Referring to FIG. 3, the cam 24 extends from an end of the fixing portion 22 and may be either integrally attached to or separately formed from the main body drive member 20. Though being coaxial, a diameter of the cam 24 is smaller than the diameter of the fixing portion 22. The cam 24 includes two symmetrical first cam portions 242. A first stage 252 and a second stage 254 are respectively formed at bottoms of inner surfaces of the first cam portions 242. A radial thickness of the first stage 252 is smaller than the radial thickness of the second stage 254. The first stage 252 and the second stage 254 are formed by cutting away arcuate inner material of the first cam portions 242. It not only causes a thickness of a bottom of each first cam portion 242 to be thicker than the thickness of the other part of each first cam portion 242, but also causes two first cam portions 242 having a different radial thicknesses. Each first cam portion 242 has a vertical beginning slope 2421, a resisting slope 2422, a peak 2423, a guiding slope 2424, and a valley 2425. Each of the first stage 252 and the second stage 254 at least partially surround the central hole 26, and are opposite to each other. Each of the first stage 252 and the second stage 254 extend from a beginning point of the vertical beginning slope 2421 to an end point of the guiding slope 2424 along an inner circumferential edge of each first cam portion 242. Each first cam portion 242 includes an arcuate inner surface 2427.

Figure 4:
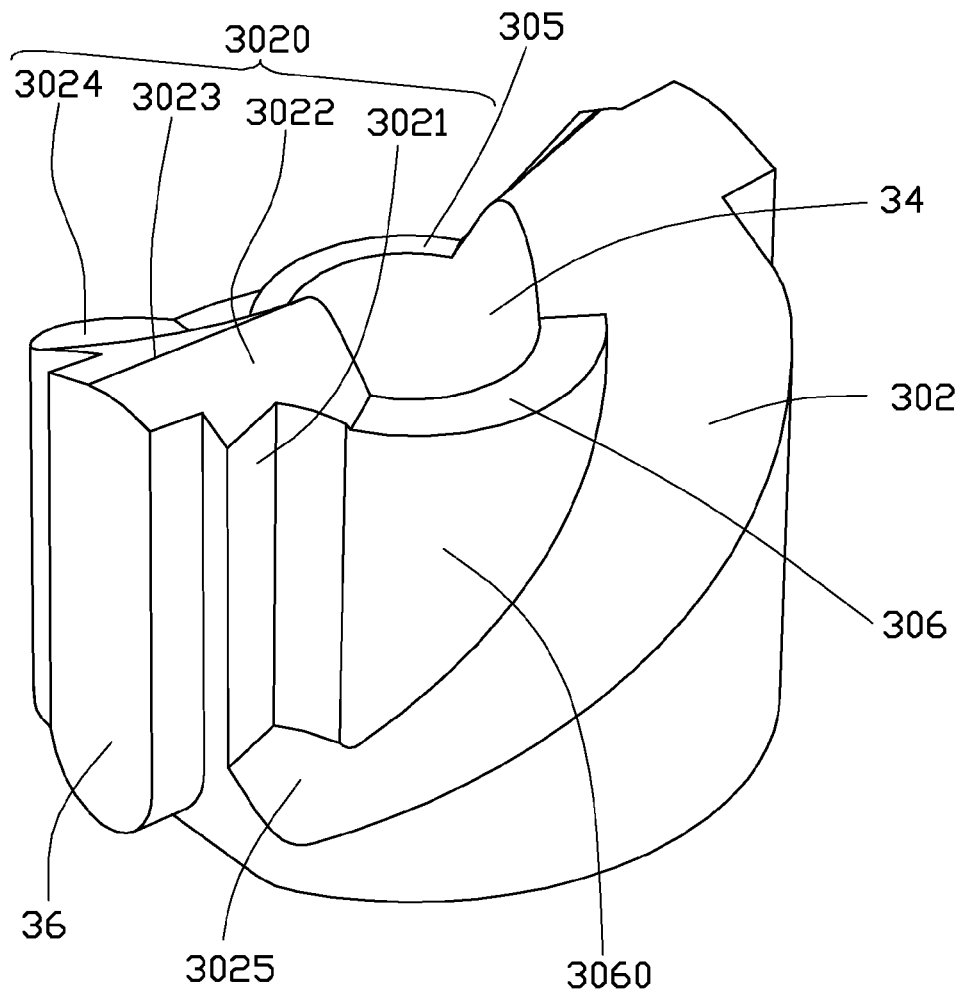
FIG. 4 is an enlarged, isometric view of the follower of the hinge assembly shown in FIG. 1.
Figure 5:
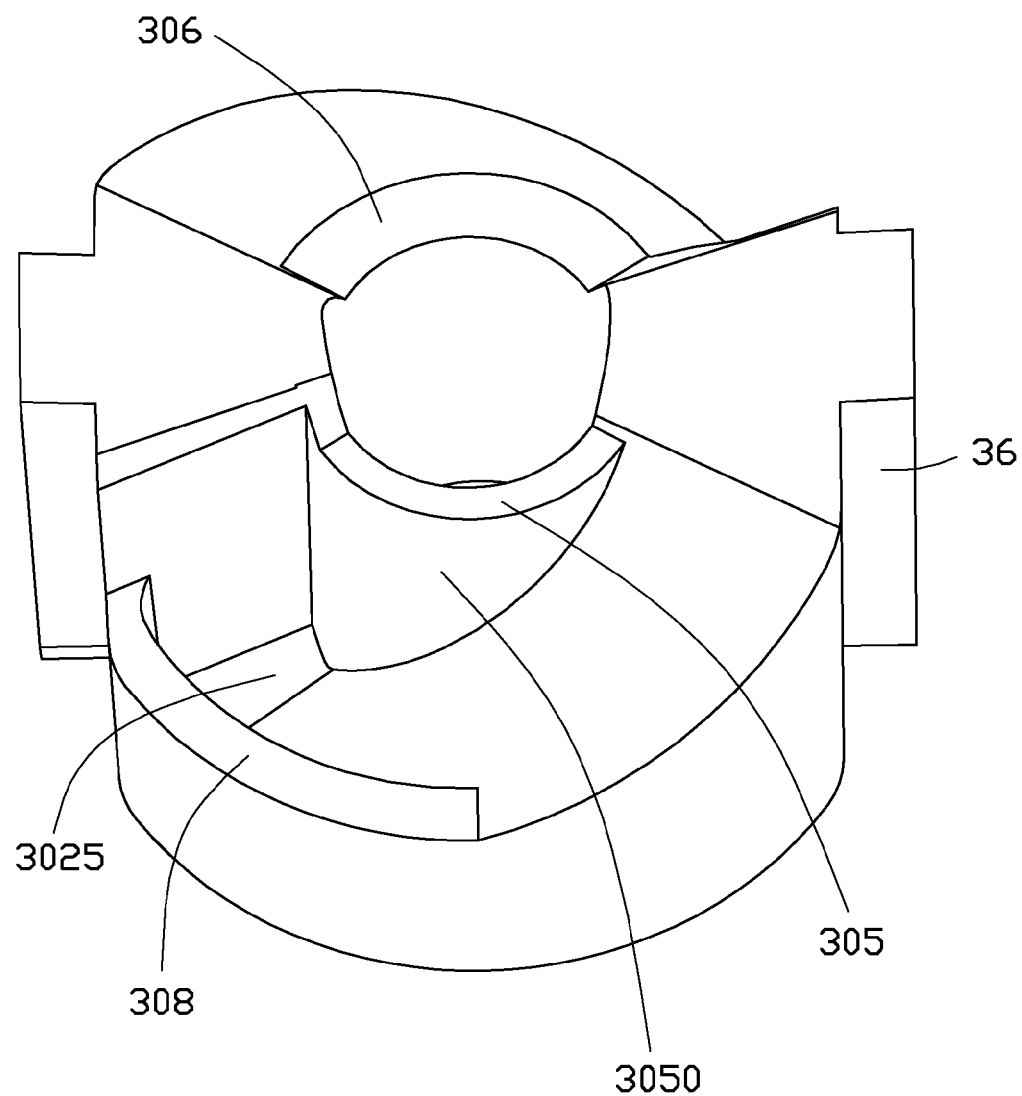
FIG. 5 is similar to FIG. 4, but viewed from another angle.

Referring to FIGS. 4 and 5, the follower 30 is substantially cylindrical. One end of the follower 30 has an engaging cam 302 for engaging with the cam 24. The other end of the follower 30 has a flat end surface 304. The follower 30 defines a circular hole 34 through a center for the shaft 10 travel through. The follower 30 has two sliding protrusions 36 formed on opposite sides of the peripheral wall. The engaging cam 302 has two symmetrical second cam portions 3020. A first supporting wall 305 and a second supporting wall 306 are formed between the two second cam portions 3020 and are positioned on inner circumferential edges of the second cam portions 3020. The first supporting wall 305 and the second supporting wall 306 at least partially surround the circular hole 34. The thickness of the first supporting wall 305 and the second supporting wall 306 respectively correspond to the radial width of the first stage 252 and the second stage 254. A thickness of the first supporting wall 305 is thinner than the thickness of the second supporting wall 306. The first supporting wall 305 includes an arcuate outer surface 3050, and the second supporting wall 306 includes an outer surface 3060. A connecting wall 308 is formed between the two second cam portions 3020 and on the outer circumferential edge of the second cam portions 3020. The connecting wall 308 is opposite to the first supporting wall 305. Each second cam portion 3020 has a vertical beginning slope 3021, a resisting slope 3022, a peak 3023, a guiding slope 3024, and a valley 3025. When the first supporting wall 305 abuts against the first stage 252 and the second supporting wall 306 abuts against the second stage 254, the vertical beginning slopes 2421 of the first cam portions 242 can contact the vertical beginning slopes 3021 of the second cam portions 3020. The peaks 2423 of the first cam portions 242 are received in the valley 3025 of the follower 30.

The first resilient member 40 is a coil spring in the present embodiment. An inner diameter of the first resilient member 40 is larger than an outer diameter of the rod 14, so that the first resilient member 40 may be mounted around the rod 14. One end of the first resilient member 40 abuts against the end surface 304.

The second resilient member 50 is a coil spring in the present embodiment. An inner diameter of the second resilient member 50 is larger than an outer diameter of the first resilient member 40, so that the second resilient member 50 may be mounted around the first resilient member 40.

The cover drive member 60 is a substantially hollow cylinder. An outer diameter of the follower 30, the outer diameter of the first resilient member 40, and an outer diameter of the second resilient member 50 are all smaller than an inner diameter of the cover drive member 60, so that the follower 30 and the first and second resilient members 40, 50 can be received in the cover drive member 60. The cover drive member 60 has an open end 62 and an opposite partially-closed end 64. A diameter of the fixing portion 22 of the main body drive member 20 is smaller than a diameter of the open end 62, so that the fixing portion 22 can move in the cover drive member 60. The partially-closed end 64 defines a central aperture 642. The cover drive member 60 has two parallel flat surfaces 66 on a peripheral wall. The cover drive member 60 defines two guiding slots 68 respectively through the two flat surfaces 66 for the two sliding protrusions 36 mounting therein. Each sliding protrusion 36 of the follower 30 is slidably received in one corresponding guiding slot 68. The cover drive member 60 engages with the cover 310 of the foldable electronic device 300 so that the cover drive member 60 rotates with the cover 310.

The disk 70 is made of metal material. In the present embodiment, the disk 70 is substantially C-shaped and is clasped in the groove 142, thereby mounting the shaft 10.

Figure 6:
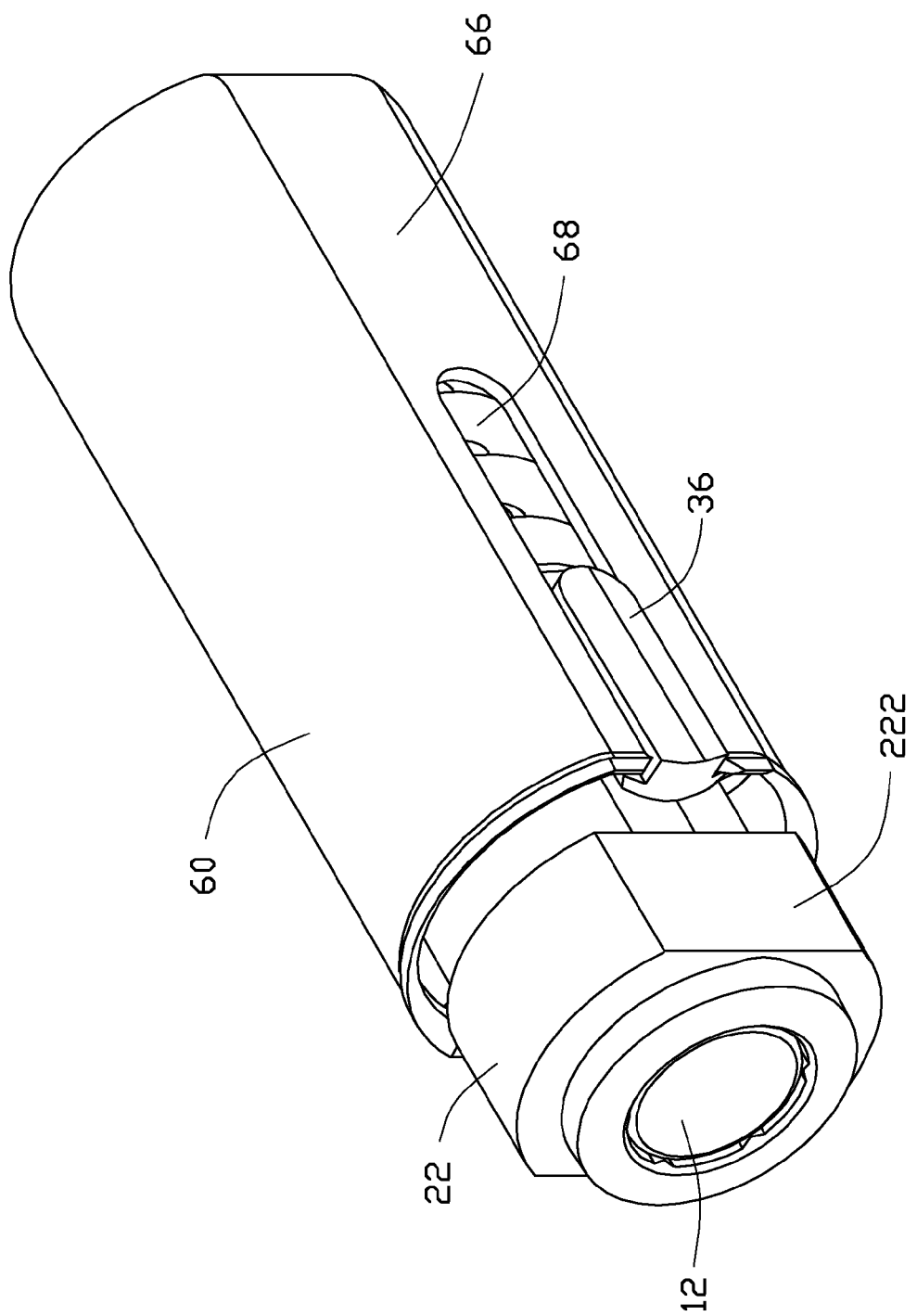
FIG. 6 is an assembled, isometric view of the hinge assembly shown in FIG. 1.

Referring to FIG. 6, in assembly, the shaft 10 travels through the hole 26 of the main body drive member 20 and the positioning protrusions 262 resist the head 12, so that the main body drive member 20 is fixed to the shaft 10. The follower 30, the first resilient member 40, the second resilient member 50, and the cover drive member 60 are mounted with the shaft 10 in turn. The second cam portions 3020 of the follower 30 engage with the first cam portions 242 of the cam 24. The first supporting wall 305 and the second supporting wall 306 respectively abut against the first stage 252 and the second stage 254. The hinge assembly 100 is at an assembled state. Each sliding protrusion 36 of the follower 30 is received in one corresponding guiding slot 68. One end of each of the first and second resilient members 40, 50 abuts against the end surface 304, and the other end of each of the first and second resilient members 40, 50 abuts against the partially-closed end 64. The coiling direction of the second resilient member 50 is reverse relative to the coiling direction of the first resilient member 40. One end the rod 14 travels through the aperture 642, and the disk 70 is mounted in the groove 142. Thus, the hinge assembly 100 is assembled.

Referring to FIG. 7, when mounting the hinge assembly 100 with the foldable electronic device 300, the hinge assembly 100 is partially received in the hinge cavity 312. The fixing portion 22 is pushed to move towards the disk 70, hence the follower 30 moves and compresses the first and second resilient members 40, 50. When the fixing portion 22 is moved into the cover drive member 60 and the hinge cavity 312 and faces the mounting hole 322, the fixing portion 22 is released and automatically moves into the mounting hole 322 due to the decompression of the first and second resilient members 40, 50. The main body drive member 20 non-rotatably engages with the main body 320, and the cover drive member 60 non-rotatably engages with the cover 310.

Figure 8:
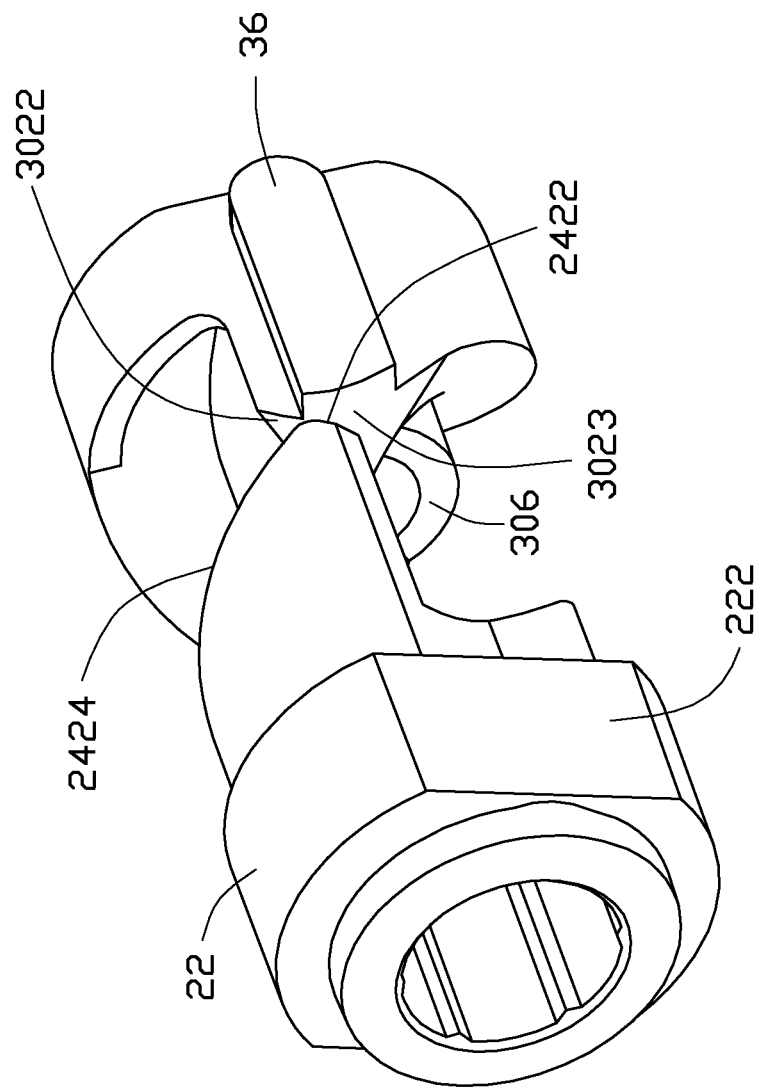
FIG. 8 is an assembled, isometric view of the main body drive member and the follower of the hinge assembly shown in FIG. 7, showing a state of the hinge assembly.

Referring to FIG. 8, when the cover 310 is closed relative to the main body 320, the follower 30 is rotated relative to the main body drive member 20 to an initial state from the assembled state. The resisting slope 3022 of the follower 30 abuts against the resisting slope 2422 of the main body drive member 20. The first and second resilient members 40, 50 are compressed to enable the cover 310 and the main body 320 to be in a closed, stable state.

Figure 9:
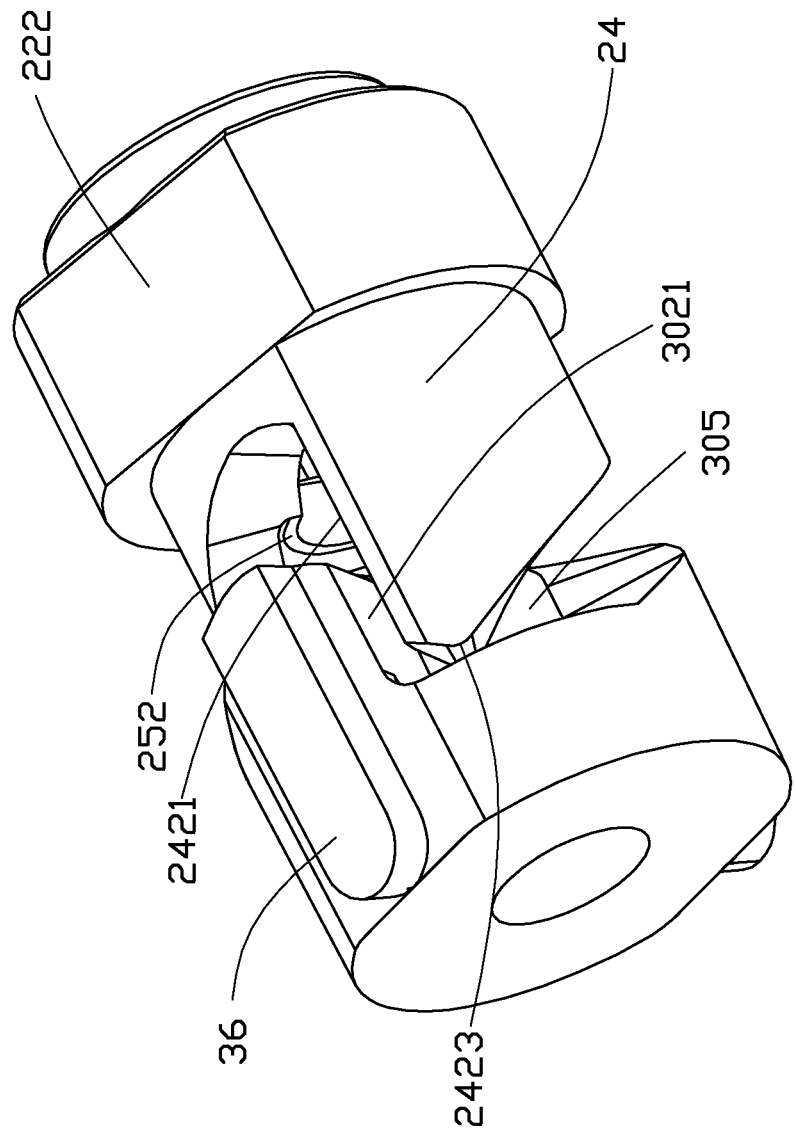
FIG. 9 is an assembled, isometric view of the main body drive member and the follower of the hinge assembly shown in FIG. 8, showing another state of the hinge assembly.

To open the foldable electronic device 300, the cover 310 is manually rotated up relative to the main body 320, hence the cover drive member 60 and the follower 30 rotate relative to the main body drive member 20 and the cam 24. The peak 3023 of the follower 30 slides along the resisting slope 2422, and the first and second resilient members 40, 50 are compressed further. When the cover 310 is opened about an angle, for example, in between 0 degree and 50 degrees, the peak 3023 slides over the peak 2423 of the first cam portion 242. In the present embodiment, the angle is about 25 degrees. At the same time, the first and second resilient members 40, 50 are mostly compressed. Then the cover 310 is released, the follower 30 automatically rotates relative to the cam 24 due to the decompression of the first and second resilient members 40, 50. Referring to FIG. 9, the peak 3023 slides along the guiding slope 2424 toward the valley 2425 to an open state. Thus, the cover 310 automatically rotates to a fully and stable open state, about 170 degrees relative to the main body 320. The process of closing the cover 310 is reverse to the process of opening the cover 310.

At the open state of the hinge assembly, the first supporting wall 305 is rotated to be opposite to the second stage 254, and the second supporting wall 306 is rotated to be opposite to the first stage 252. The thicker second supporting wall 306 prevents one first cam portion 242 from rotating toward the valley 3025. Accordingly, the first cam portions 242 are prevented from falling down to the valley 3025 of the follower 30 in the opened state of the cover 310. Peaks of conventional hinges are easily self-locking with the valleys. This structure of the present disclosure can effectively prevent the peaks of the first cam portions 242 from being latched in the valleys 3025. Furthermore, the connecting wall 308, the supporting walls 305, 306 can enhance the strength of the two second cam portions 3020 and prevent the follower 30 from deforming. Additionally, the inner arcuate surfaces 2427 of the cam 24 contact with the outer surfaces 3050, 3060 of the first supporting wall 305 and the second supporting wall 306. Thus, the first supporting wall 305 and the second supporting wall 306 act as a buffer. This can prevent forceful impacts produced between the cam 24 and the follower 30 when the cam surfaces are steep.

It should be understood that the cam portions of follower 30 and the cam 24 may have other shapes. The shape of the cam portion may be changed according to the open angle of the cover. For example, when changing the angle of the guiding slope, the cover may be opened over 180 degrees relative to the main body.

It should be understood that the disk 70 may be mounted with the shaft 110 by weld.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge assembly for interconnecting a cover and a main body of a foldable electronic device, comprising:
    a shaft including a head having a first diameter and a rod having a second diameter, the second diameter being smaller than the first diameter;
    a main body drive member fixed with the head of the shaft, one end of the main body drive member having a cam, the cam including two first cam portions, a first stage and a second stage at a bottom inner surface of the first cam portions, the first stage is thinner than the second stage;
    a follower rotatably and slidably fitted around the rod of the shaft and adjacent to the cam, one end of the follower having an engaging cam engaging with the cam of the main body drive member, the engaging cam including two second cam portions, a first supporting wall and a second supporting wall formed between the two second cam portions and on inner circumferential edges of the second cam portions, a thickness of the first supporting wall is thinner than a thickness of the second supporting wall, each first cam portion includes a peak, each second cam portion orderly includes a vertical beginning slope, a resisting slope, a peak, a guiding slope and a valley, the peak of each first cam portion slides along the resisting slopes, the peaks, and the guiding slopes of the second cam portions to the valleys of the second cam portions, the first supporting wall and the second supporting wall engage the first stage and second stage respectively, preventing the peaks of the first cam portions from falling into the valleys of the second cam portions; and
    a resilient member;
    wherein the resilient member causes the engaging cam of the follower to resist the cam of the main body drive member due to the decompression of the resilient member, and when the follower is manually rotated relative to the main body drive member about an angle, the follower automatically rotates relative to the main body drive member due to the decompression of the resilient member.

2. The hinge assembly of claim 1, wherein the angle of the follower relative to the cam is between 0 degrees and 50 degrees.

3. The hinge assembly of claim 1, wherein the angle of the follower relative to the cam is about 25 degrees.

4. The hinge assembly of claim 1, wherein the main body drive member defines a central hole, a plurality of positioning projections are formed on the inner wall of the main body drive member, and the head is received in the hole and resists the positioning projections.

5. A foldable electronic device, comprising:
    a main body;
    a cover rotatably mounted with the main body; and
    a hinge assembly interconnecting the cover with the main body, the hinge assembly comprising:
    a shaft including a head having a first diameter and a rod having a second diameter, the second diameter being smaller than the first diameter;
    a main body drive member fixed with the head of the shaft and rotating with the main body, one end of the main body drive member having a cam, the cam including two first cam portions, a first stage and a second stage at a bottom inner surface of the first cam portions, the first stage is thinner than the second stage;
    a follower rotatably and slidably fitted around the rod of the shaft, adjacent to the cam and rotating with the cover, one end of the follower having an engaging cam engaging with the cam of the main body drive member, the engaging cam including two second cam portions, a first supporting wall and a second supporting wall formed between the two second cam portions and on inner circumferential edges of the second cam portions, a thickness of the first supporting wall is thinner than a thickness of the second supporting wall, each first cam portion includes a peak, each second cam portion orderly includes a vertical beginning slope, a resisting slope, a peak, a guiding slope and a valley, the peak of each first cam portion slides along the resisting slopes, the peaks, and the guiding slopes of the second cam portions to the valleys of the second cam portions, the first supporting wall and the second supporting wall engage the first stage and the second stage respectively, preventing the peaks of the first cam portions from falling into the valleys of the second cam portions; and
    a resilient member;
    wherein the resilient member causes the engaging cam of the follower to resist the cam of the main body drive member due to the decompression of the resilient member, and when the follower is manually rotated relative to the main body drive member about an angle, the follower automatically rotates relative to the main body drive member due to the decompression of the resilient member.

* * * * *